United States Patent [19]
Hansen et al.

[11] Patent Number: 5,310,488
[45] Date of Patent: May 10, 1994

[54] WATER TREATMENT METHOD

[75] Inventors: Christopher L. Hansen, Newbury; Glen E. Latimer, Jr., Leavittsburg, both of Ohio

[73] Assignee: Kinetico Incorporated, Newbury, Ohio

[21] Appl. No.: 663,251

[22] Filed: Mar. 1, 1991

[51] Int. Cl.$^5$ .............................................. B01J 49/00
[52] U.S. Cl. ......................................... 210/674; 521/26
[58] Field of Search ......................... 210/674; 521/26

[56] References Cited

U.S. PATENT DOCUMENTS

| | | | |
|---|---|---|---|
| 2,769,787 | 11/1956 | Diamond | 521/26 |
| 4,071,446 | 1/1978 | Kunin | 210/32 |
| 4,083,782 | 4/1978 | Kunin | 210/32 |
| 4,116,860 | 9/1978 | Kunin | 252/192 |
| 4,693,814 | 9/1987 | Brown | 210/88 |
| 4,764,280 | 8/1988 | Brown et al. | 210/662 |
| 4,804,465 | 2/1989 | Brown | 210/136 |

Primary Examiner—Ivars Cintins
Attorney, Agent, or Firm—Watts, Hoffmann, Fisher & Heinke Co.

[57] ABSTRACT

A water treatment apparatus and method for softening "problem water". The apparatus includes a pair of treatment tank assemblies, each tank including serially connected filter and ion exchange beds. When a tank assembly requires regeneration, the tank assembly is taken off line and is regenerated using a regenerating apparatus that communicates a mixture of citric acid and brine solution to the ion exchange bed, followed by brine solution alone to form a barrier. A mixture of sodium carbonate and brine solution is then communicated to the ion exchange bed followed by a backwashing step which conveys treated water through both the ion exchange bed and the filter media in a counter flow direction. The regeneration apparatus includes a brine venturi and a chemical draw venturi connected in a parallel flow relationship and solenoid control valves for selectively communicating either a citric acid reservoir or a sodium carbonate reservoir to the chemical draw venturi. A timer or sequencer sequentially activates the control valves for predetermined time intervals. A heater and insulation is provided for the sodium carbonate reservoir to inhibit precipitation of the sodium carbonate out of solution. The regeneration apparatus also includes a flushing arrangement for flushing a fluid path along which the sodium carbonate solution flows during regeneration.

18 Claims, 7 Drawing Sheets

WATER TREATMENT METHOD

TECHNICAL FIELD

The present invention relates generally to fluid treatment systems and in particular to a new and improved water treatment apparatus and method for treating water having a relatively high iron content.

BACKGROUND ART

Water softeners of the "ion exchange"-type typically include a resin tank through which hard water passes to exchange its "hard" ions of calcium and magnesium for "soft" sodium ions from the resin bed. Regeneration of the resin bed is required periodically to remove the accumulation of hard ions and replenish the supply of soft ions. Regeneration is typically effected by flushing a brine solution through the resin bed. A water softener of this type is more fully described in U.S. Pat. No. 3,891,552 issued Jun. 24, 1975 to William Prior and James W. Kewley, entitled CONTROL VALVE FOR WATER SOFTENERS.

Modern water softeners of the type disclosed in U.S. Pat. No. 3,891,552 typically employ a brine tank which includes a reservoir and supply of salt disposed at a level above the bottom of the reservoir. A tube connected to a source of water establishes a path for water to flow to the reservoir. Upon the attainment of a predetermined level in the reservoir, the water reacts with the salt supply to produce a source of brine for regeneration of the resin bed. When regeneration is required, the brine is aspirated through the same tube that supplied water to the reservoir. The amount of water introduced to the brine tank after the regeneration cycle and the amount of brine aspirated from the tank during a regeneration cycle is controlled by a brine valve mechanism.

Commercially available water softeners generally include one or two tanks which contain the softening chemicals that form the resin beds. In one type of two-tank water softener, one tank is regenerated and kept "off-line" while the other tank is "on-line." A control valve controls the communication of the tanks with the household water supply and controls the timing and sequence of regeneration. An example of such a control valve is disclosed in U.S. Pat. No. 3,891,552. An improved control valve is described in U.S. Pat. No. 4,298,025. Both of these patents are owned by the present assignee and are herein incorporated by reference.

A prior art resin tank typically comprises an elongate cylinder in which the ion exchange resin is contained. A conduit, often called a riser pipe, extends downwardly from the top of the tank. A filter screen, mounted at the end of the conduit prevents the entry of resin into the conduit. An opening is formed in the top of the tank for discharging or admitting fluid depending on the direction of the flow.

In many applications, prior art water softeners such as the one described in the above referenced patent, perform satisfactorily. However, in some areas of the country "problem water" is encountered which is not easily treated by conventional water softening apparatus. In particular, in some regions, the water has a high iron content and a relatively low pH. When a standard water softening apparatus is used to treat this type of water, the result is usually considered unacceptable or marginally acceptable.

Methods and apparatus are known or have been suggested for treating water having a high iron content and low pH. Examples of specialized treatment systems are disclosed in U.S. Pat. Nos. 4,764,280 and 4,804,465, both of which are owned by the assignee of the subject application and are hereby incorporated by reference. Industrial type apparatus and methods are also known for treating problem water but, many if not most are considered uneconomical for home use or use a process that the average homeowner is not equipped to handle.

Ion exchange resins are also known which are especially effective for use in treatment systems for "problem" water. One such resin is available from the Rohm & Haas Company and is identified as Amberlite ® DP-1 resin.

Amberlite ® DP-1 cation exchange resin and other carboxylic acid exchange resins have the following general selectivity sequence, $H^+ > Ca^{++} > Mg^{++} > Na^+$. This selectivity sequence is reflected in the buffering capacity of the $Na^+$ form of the cation exchange resin in water with a pH between 5-7 and the readiness of the resin to exchange $Na^+$ for $Ca^{++}$ or $Mg^{++}$. The buffering capacity of the cation exchange resin allows the use of the resin in a water softener in applications where the source water has a pH between 5-7 without requiring the use of caustic feeders or calcite neutralizers.

When used in a water softener, Amberlite ® DP-1 will exchange with cations in aqueous solution by the following reaction:

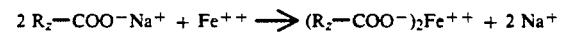

Buffering of acidic water, containing dissolved carbon dioxide ($CO_2$), occurs by the following reaction: $R-COO^-Na^+ + H_2O + H_2CO_3 \rightarrow R-COOH + NaHCO_3 + H_2O$ Sodium bicarbonate, $NaHCO_3$, as a 0.1 molar solution, has a pH of 8.4.

Regeneration of Amberlite ® DP-1, because of the resin's unusual affinity for divalent and trivalent cations and buffering ability, has previously been regenerated with strong acid/alkali solutions or a solution of sodium citrate or sodium fumarate. Amberlite ® DP-1 cannot be regenerated with brine in the same manner as conventional, sulfonic acid, water ion exchange resins are regenerated.

In Rohm and Haas U.S. Pat. No. 4,071,446, 4,116,860 and 4,083,782, methods and compositions for regenerating sodium carboxylate ion exchange resins such as Amberlite ® are described and are hereby incorporated by reference. Two of the methods described in these references for regenerating the ion exchange resin back to the sodium carboxylate form are the acid/alkali system and the sodium citrate or sodium fumarate systems.

The acid/alkali regeneration process is generally composed of the following steps:
1. Optional back wash;
2. Acid regeneration, wherein a dilute sulfuric acid solution or preferably a hydrochloric acid solution is used to wash the resin to convert the carboxylate ion back to the acid form and dissolve any accumulated iron or other metal oxides;
3. Water rinse;

4. Caustic feeder wherein a caustic solution such as sodium hydroxide, sodium carbonate or sodium bicarbonate in an amount sufficient to neutralize from 70-96% of the theoretical exchange capacity of the resin is passed through the exchange bed.
5. Slow rinse.
6. Hold.
7. Final Rinse.
8. Final back wash.

The sodium citrate or sodium fumarate system is a one step regenerating composition that is safe for a residential environment. The regenerating solution for a residential water system would be a mixture of 75 weight percent sodium chloride, 15 weight percent sodium citrate and 10 weight percent sodium carbonate. The regenerating solution is created using pellets in a conventional manner in the same way that sodium chloride pellets are use to create brine solution in a more conventional water softening system.

DISCLOSURE OF THE INVENTION

The present invention provides a new and improved method and apparatus for treating "problem water". The disclosed invention is not only capable of softening "problem water", but is also capable of removing relatively high levels of iron from the water and increasing its pH.

In accordance with the invention, the water treatment system includes an ion exchange bed that is periodically regenerated, a reservoir for regeneration solutions that are used to regenerate an exhausted or depleted ion exchange bed and a control apparatus for determining the frequency of regeneration as well as controlling the regeneration process itself. In the disclosed embodiment, the regeneration process includes the communication of a acid based regeneration solution to the ion exchange bed followed by communication of a weak alkali based solution to the bed, followed by a rinsing step. In the preferred embodiment, a barrier solution, preferably brine, is communicated to the ion exchange bed in between the acid and alkali solutions so that the acid and alkali solutions do not mix during regeneration.

In the preferred and illustrated embodiment, the acid solution comprises a citric acid solution and the alkali solution comprises a sodium carbonate solution. A brine solution is also provided. In the preferred regeneration sequence, a mixture of the citric acid solution and brine solution are communicated to the resin bed during regeneration. The brine solution is them communicated to the bed, by itself, to form the barrier solution which is then followed by communication of the sodium carbonate solution.

In the preferred embodiment, a twin tank system is disclosed in which two tanks are interconnected in a parallel flow relationship. In normal service both tanks concurrently receive water to be treated and discharge the treated water to a common outlet. When a given tank is exhausted or depleted, that tank is taken off-line, regenerated and then placed back on-line. In the preferred embodiment, each tank comprises a tank assembly that includes a filter tank and an ion exchange tank that are serially connected. The filter tank includes a bed of filter media for filtering the incoming water to remove particulate matter prior to entering the ion exchange tank. The final step in the regeneration cycle is preferably a rinse or backwash which not only rinses the resin bed but backwashes the filter bed to eject trapped particulate.

According to feature of the invention, the regeneration solutions are contained in a brine drum assembly which includes separate reservoirs for the acid and alkali solutions. In the illustrated embodiment, the reservoirs are cylindrical wells that are attached to the inside of the brine drum. The brine drum itself includes a platform upon which a salt supply is located that sits above the bottom or base of the drum. Brine solution, as is known, is created by adding water to the brine drum which dissolves a portion of the salt supply. In the disclosed embodiment, a brine control valve located within the drum determines the quantity of brine solution that is communicated to the resin bed during the regeneration cycle.

According to another feature of the invention, the regeneration solutions are drawn through venturis forming part of a regeneration apparatus. In the preferred embodiment, a control valve assembly similar to the control valve assembly disclosed in U.S. Pat. Nos. 3,891,552 and 4,298,025, communicates treated water to the regeneration control apparatus. When regeneration is called for, flow through the regeneration apparatus is enabled.

In the preferred regeneration apparatus, a pair of venturis are disposed in a parallel flow relationship. During regeneration, treated water is communicated to both venturis from the control valve assembly. One of the venturis is used to draw brine solution from the brine reservoir; the other venturi is used to draw either the acid regeneration solution or the alkali regeneration solution (but not both simultaneously). Control valves determine which of the solutions is communicated to the second or chemical venturi.

In the preferred embodiment, a multi-pole timer is used control the actuation of the control valves. Preferably, at commencement of regeneration, a first pole is energized by the timer which activates a acid regeneration solution solenoid valve thus communicating the acid solution reservoir with the second venturi. The solution drawn into the second venturi, is mixed with treated water and is in turn mixed with the output of the first venturi (diluted brine). The mixture of brine solution and acid solution is then communicated to the resin bed being regenerated via the control valve assembly.

Following a predetermined draw time, the timer terminates the acid solution solenoid valve. Preferably, brine solution is allowed to proceed to the resin bed by itself, to form a barrier between the acid and the alkali solutions. Following a predetermined interval, the timer activates a alkali solution solenoid valve to communicate the alkali reservoir with the second venturi. For a predetermined interval of time, a mixture of brine solution and alkali solution is communicated to the resin bed.

Following the chemical draw steps, the resin bed is backwashed (in a counter-flow direction) using treated water from the on-line tank. During the backwashing step, particulate matter trapped by the filter media is ejected from the tank. In the preferred embodiment, the regenerated tank is placed on line, in a parallel flow relationship with the other tank assembly after regeneration.

According to a feature of the invention, a flushing step is performed by the regeneration control apparatus which flushes the feed lines and associated components through which the alkali solution is drawn. In the preferred system, sodium carbonate is used to form the alkali solution. Since sodium carbonate tends to precipitate out of solution at normal room temperatures, this flushing step purges the feed lines and components of sodium carbonate which would otherwise precipitate.

According to a further feature of the invention, the reservoir for alkali solution is heated to inhibit precipitation of the sodium carbonate. In the preferred embodiment, the heater is a self-regulating heater assembly that is disposed inside the sodium carbonate reservoir which maintains the reservoir above room temperature. Preferably the heater assembly maintains the solution in a range of 110–120° F. According to a further feature of this embodiment, the reservoir itself is insulated to reduce the heat load and to retain heat within the reservoir should a power failure interrupt power to the heater assembly.

In the preferred embodiment, the multi-pole timer or sequencer is activated by a sensor that is responsive to brine being drawn into the first venturi. Preferably the sensor comprises a pressure switch which monitors pressure in a brine draw conduit and completes the circuit to the timer whenever brine solution is being called for by the brine venturi.

The present invention provides a new and improved water treatment system which is capable of treating "problem water". When embodied in a water softener, the system is capable of softening water having a relatively low pH and a relative high iron content. In the preferred method and apparatus, the ion exchange media is a weak acid carboxylic cation resin which is regenerated using weak acid and weak alkali solutions. In the disclosed embodiment, the regeneration solutions are all considered food grade and therefore the system is capable of being used by residential customers.

Additional features of the invention will become apparent and a fuller understanding obtained by reading the following detailed description made in connection with the accompanying drawings.

BEST MODE FOR CARRYING OUT THE INVENTION

Figure 1A:
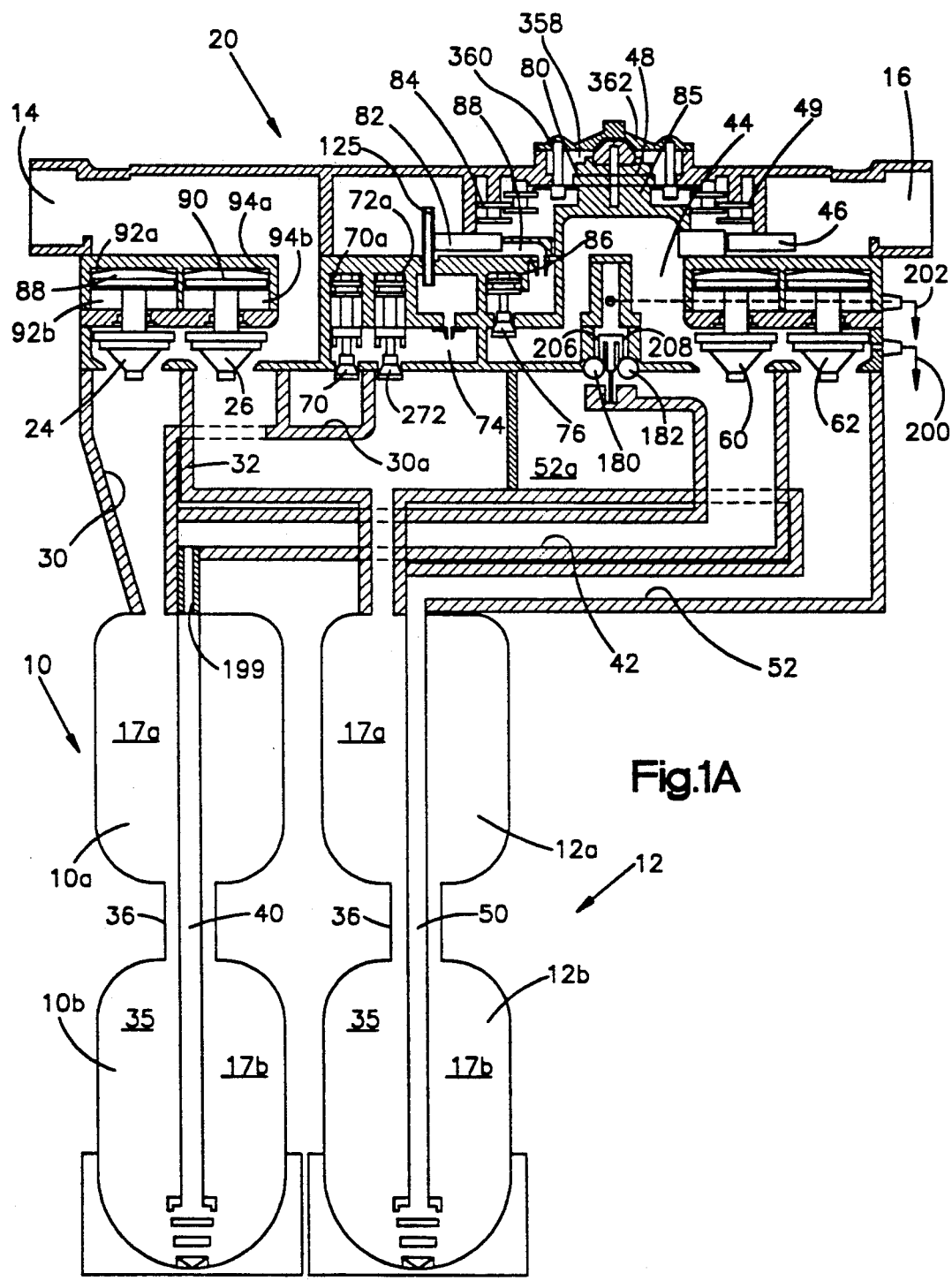
FIGS. 1A and 1B illustrate the overall construction of a water softening apparatus constructed in accordance with the preferred embodiment of the invention.
Figure 1B:
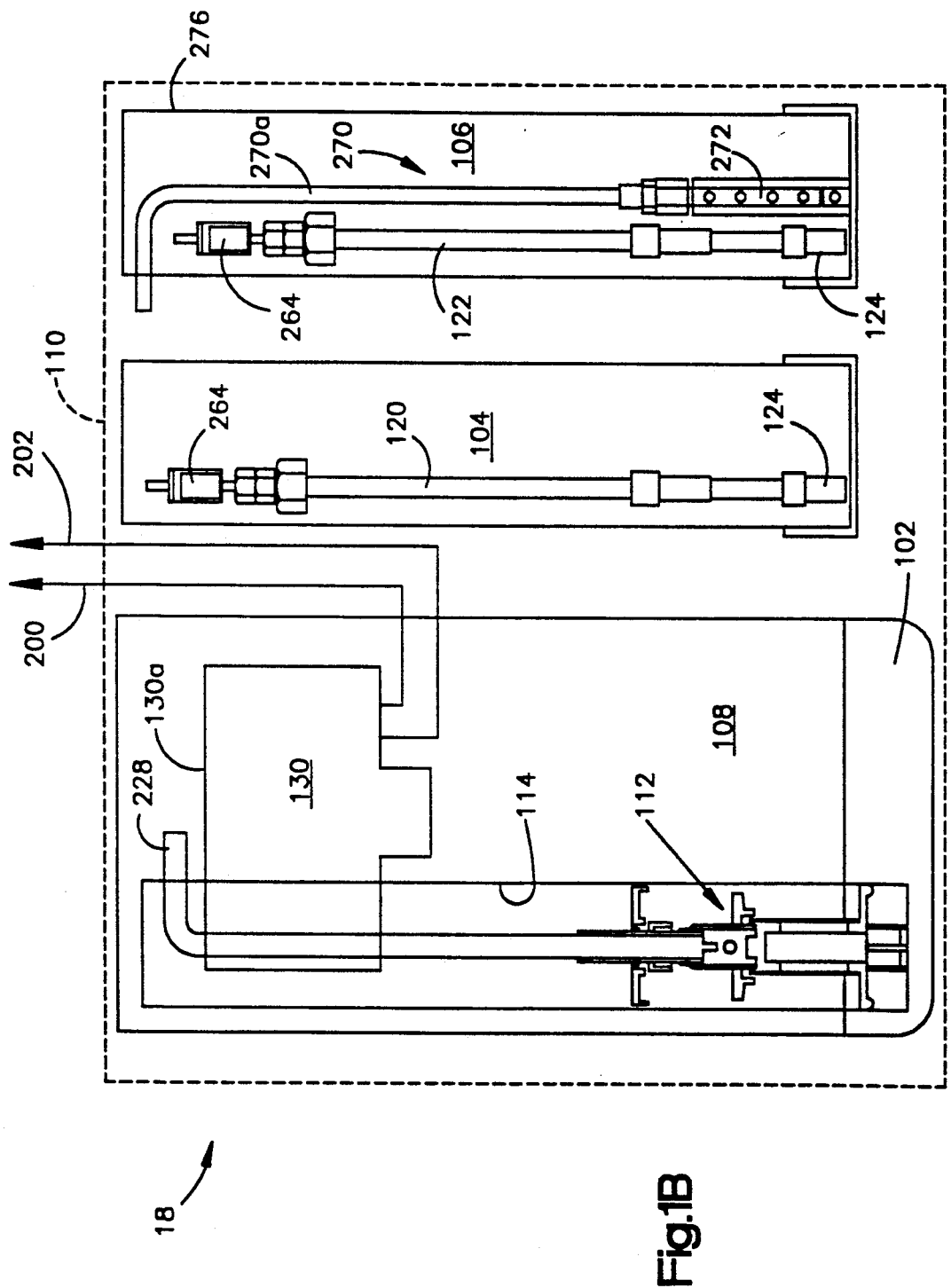
Figure 2A:
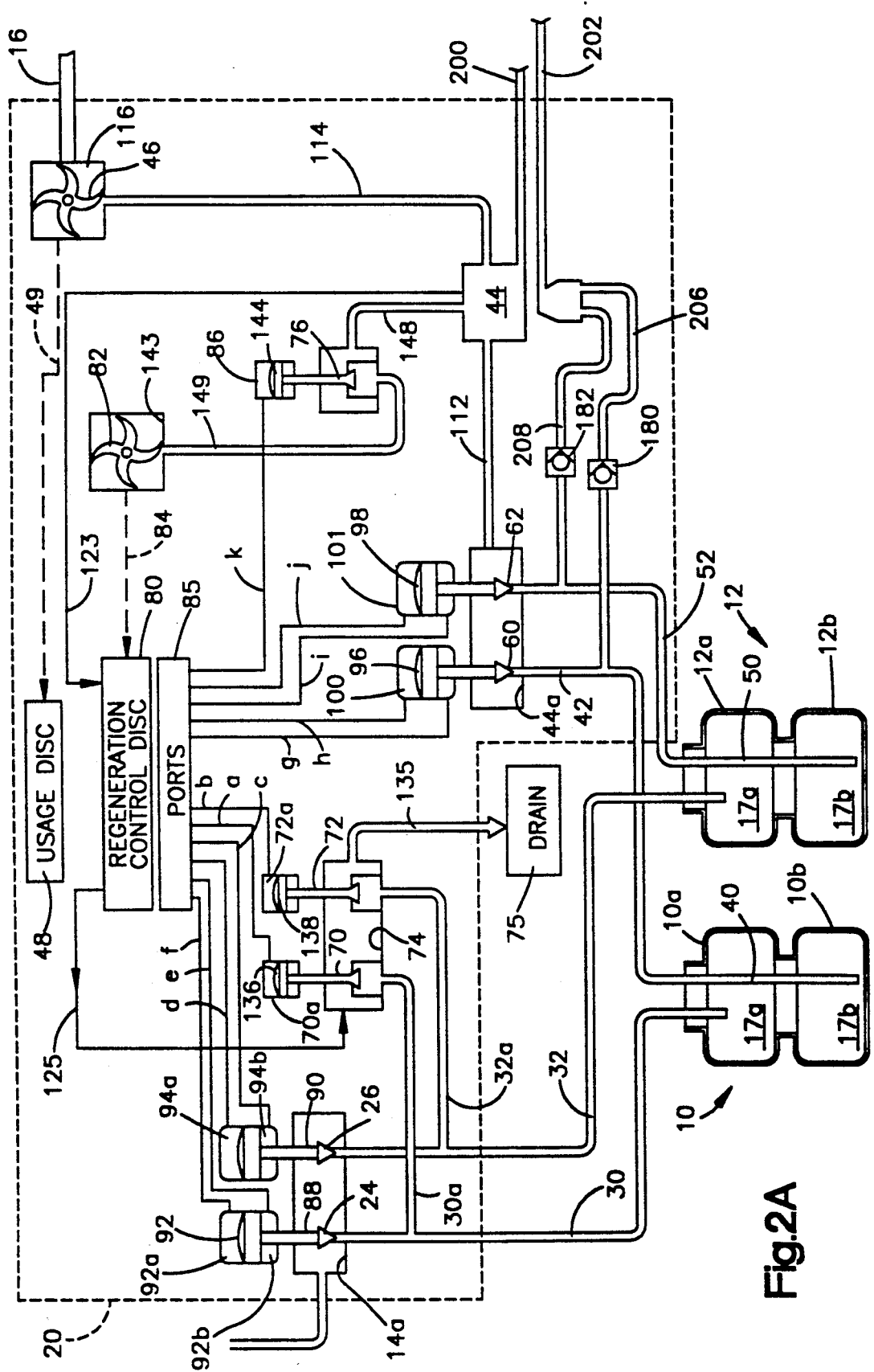
FIGS. 2A and 2B illustrate the water softening system shown in FIGS. 1A and 1B in a more schematic fashion.
Figure 2B:
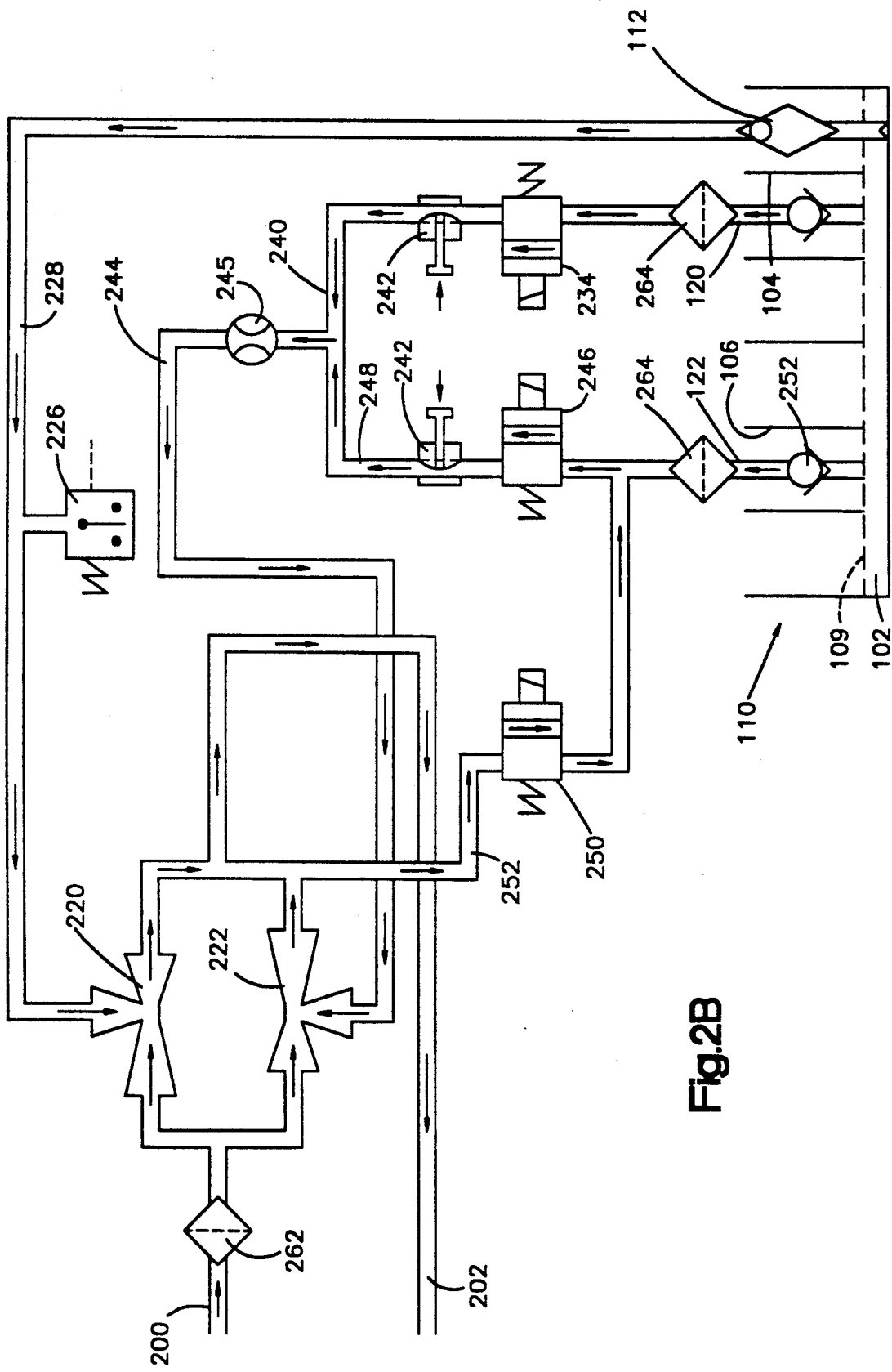

FIGS. 1A, 1B illustrate a water softening system embodying the present invention. FIGS. 2A, 2B illustrate the apparatus of FIGS. 1A, 1B in a more schematic fashion.

Referring to FIGS. 1A, 1B, a pair of tank assemblies 10, 12 containing suitable filter and ion exchange material are used to filter and treat water that is communicated to the tank assemblies by an inlet 14. The treated water is delivered to an outlet 16.

In accordance with the preferred embodiment, each tank assembly, 10, 12 includes an iron filter bed and a water softening resin bed 17a, 17b respectively. In the preferred embodiment, the beds are housed in a pair of serially connected tanks 10a, 10b and 12a, 12b respectively. The filter media for the iron filter beds can be formed by a variety of materials that are commercially available from suppliers such as 3M.

In normal service, water to be filtered and treated is concurrently communicated to the tank assemblies 10, 12 by means of a pair of opened inlet valves 24, 26.

The inlet valves 24, 26 form part of a control valve assembly 20 which not only controls the communication of water to be treated to the tank assemblies 10, 12, but also controls the regeneration of an individual tank assembly when required. The control valve 20 is similar in operation to the control valve described in U.S. Pat. Nos. 3,891,552 and 4,298,025 which are hereby incorporated by reference. A source of regeneration solutions indicated by the reference 18 (shown in FIGS. 1B, 2B) is connected to the control valve 20.

The control valve 20 defines in inlet passage 30 (controlled by the inlet valve 24) which conducts water to be treated to the tank assembly 10. Another passage 32 (controlled by the inlet valve 26) conducts water to be treated to the tank assembly 12. Water to treated enters the upper tank section 10a and passes through the filter media 17a contained therein. After passing through filter material contained in tank section 10a, the water enters the lower tank section 10b through the tank coupling 36 and passes through the ion exchange resin 17b contained therein.

The treated water leaves the lower tank section 10b through a riser tube 40. From the riser tube, the treated water flows through an outlet passage 42 defined by the valve 20 and into an outlet chamber 44. From the outlet chamber 44, the treated water travels past a usage monitoring turbine 46 and then to the outlet 16. The usage turbine 46 is connected to a monitoring mechanism which is more fully described in the two above-identified patents and which will be more fully discussed below. As will be more fully explained, the water usage turbine 46 is rotatably coupled to a usage disc 48 by a gear train 49 so that the usage disc 48 rotates in response to the treated water moving past the turbine. The extent of movement of the usage disc 48 is an indication of the amount of treated water that has been treated since a previous tank regeneration.

A similar riser tube 50 is located in the tank assembly 12 and communicates with an outlet passage 52 defined by the Control Valve 20. The passage 52 ultimately conveys treated water from the tank assembly 12 to the outlet chamber 44 where it too passes by the turbine 46 on its way to the outlet 16.

A pair of outlet valves 60, 62 are located at the downstream ends of the outlet passages 42, 52 and control the communication of these passages with the outlet chamber 44. As will be further described, the outlet valve associated with a tank assembly being regenerated is closed during most of the regeneration cycle so that the tank being regenerated is isolated from the tank assembly that is in service.

The control valve assembly 20 includes a pair of drain valves 70, 72 which control the communication of respective inlet passages 30, 32 with a common drain chamber 74. The drain valve 70 in the illustrated embodiment actually controls the fluid communication of a branch inlet chamber 30a with the drain chamber 74. The branch chamber 30a communicates with the inlet passage 30.

The drain chamber 74 communicates with an ambient drain 75 (not shown in FIG. 1A). During normal service operation, with both tanks delivering filtered and treated water to the outlet 16, both drain valves 70, 272 are closed as shown in FIGS. 1A and 2A.

The control valve assembly 20 also includes a regeneration control valve 76, which when opened, controls the regeneration time of the tank assembly being regenerated In normal service operation, the control valve 76 is closed as shown in FIGS. 1A and 2A.

As indicated above, during normal operation, both tank assemblies are in a parallel flow relationship in that water to be filtered and treated entering the inlet 14 is concurrently communicated to the tank assemblies 10, 12 by way of the respective inlet passages 30, 32. After a predetermined amount of water is treated as measured by the water usage turbine 46, one of the tank assemblies 10, 12 is regenerated in order to remove the captured ions from the ion exchange media in the lower tank section i.e. 10b and to discharge foreign material captured by the filter media in the upper tank section i e. 10a, in a given tank assembly. The regeneration cycle is controlled at least in part by a control disc 80 which is driven by a turbine 82 and associated gear train 84.

The operation of the turbine 82 and gear train 84 is more fully disclosed in U.S. Pat. No. 4,298,025 which has previously been incorporated by reference. As a more fully explained in that patent, the control disc 80 forms part of a fluid pressure operated servo control system that controls the pressurization of fluid chambers that control the position of the various valves forming part of the control valve 20. The operation of the control disc 80 will be more fully described in connection with the description of FIGS. 5A, 5B.

As is known, an ion exchange media eventually requires regeneration when most or all of its ion exchange sites hold an ion. In the preferred and illustrated embodiment, the ion exchange media 17b contained in tank sections 10b, 12b comprises a weak acid carboxylic cation resin. A resin of this type is sold by the Rhom and Haas Company under the trademark AMBERLITE. A particular resin available from Rhom and Haas designated as DP-1 is especially useful in "problem water" applications, i.e., in applications where the source water has a relatively low pH and a relatively high amount of undissolved and dissolved iron. This particular resin, as more fully explained in Rhom and Haas U.S. Pat. Nos. 4,071,446 and 4,083,782, is not readily regenerated using a simple brine solution. In the preferred and illustrated embodiment, a regeneration apparatus and method are provided for regenerating this type of resin, which is capable of residential or home use.

In the preferred and illustrated embodiment, an exhausted or depleted tank assembly is regenerated using an automatic process control that utilizes weak acid and weak base solutions in addition to the normal brine solution. In accordance with the invention and referring to FIGS. 1B and 2B, the source of regeneration solutions indicated generally by the reference character 18 includes a source of brine solution 102, a weak acid regeneration solution 104 and a weak base regeneration solution 106. In the disclosed embodiment, the weak acid regeneration solution comprises a citric acid solution and the alkali regeneration solution comprises a sodium carbonate solution.

Figure 3:
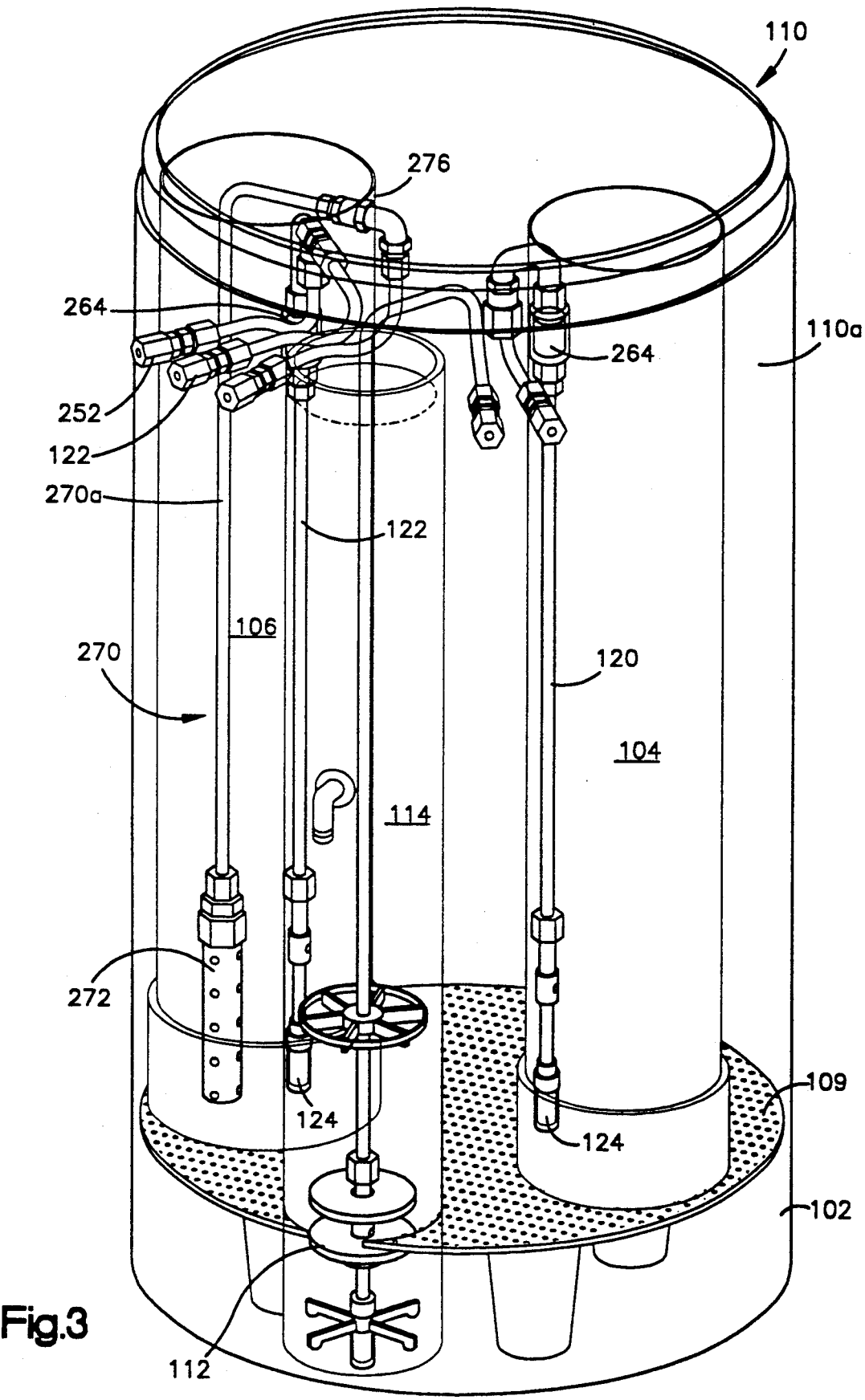
FIG. 3 is an elevational view (with some portions shown in phantom) of a brine drum assembly constructed in accordance with the preferred embodiment of the invention.

In the preferred apparatus and referring to FIG. 3, a brine drum assembly 110 is provided which includes a salt supply 108 (indicated in FIG. 1B) which sits on a platform 110 spaced above the bottom of the brine drum. A brine control valve 112, located in a well 114, controls the amount of brine drawn during a regeneration cycle and also controls refilling of the brine drum to provide the brine solution for the next regeneration cycle. The brine valve 112 is conventional and does not form part of the present invention. Examples of brine valves that will function in the disclosed apparatus are shown in U.S. Pat. Nos. 4,889,623 and 4,336,134, both of which are owned by the present assignee and are hereby incorporated by reference.

Referring also to FIG. 3, in the preferred embodiment, the acid and base regeneration solution reservoirs are both mounted within the brine drum 110. As seen best in FIG. 3, the solution reservoirs are both cylindrical in shape and sit atop the salt platform 109 and are suitably attached to a brine drum side wall 110a. Draw tubes 120, 122 extend downwardly from the top of each reservoir and each terminate in a screen 124.

As seen in FIG. 1B, the valving and plumbing for performing the regeneration steps during the regeneration cycle of a depleted resin tank are contained in a compartment, indicated generally by the reference character 130, attached to the side of the brine drum. A cover 130a is removably attached to the side of the brine drum and shrouds the valving and other control components.

Figure 4:
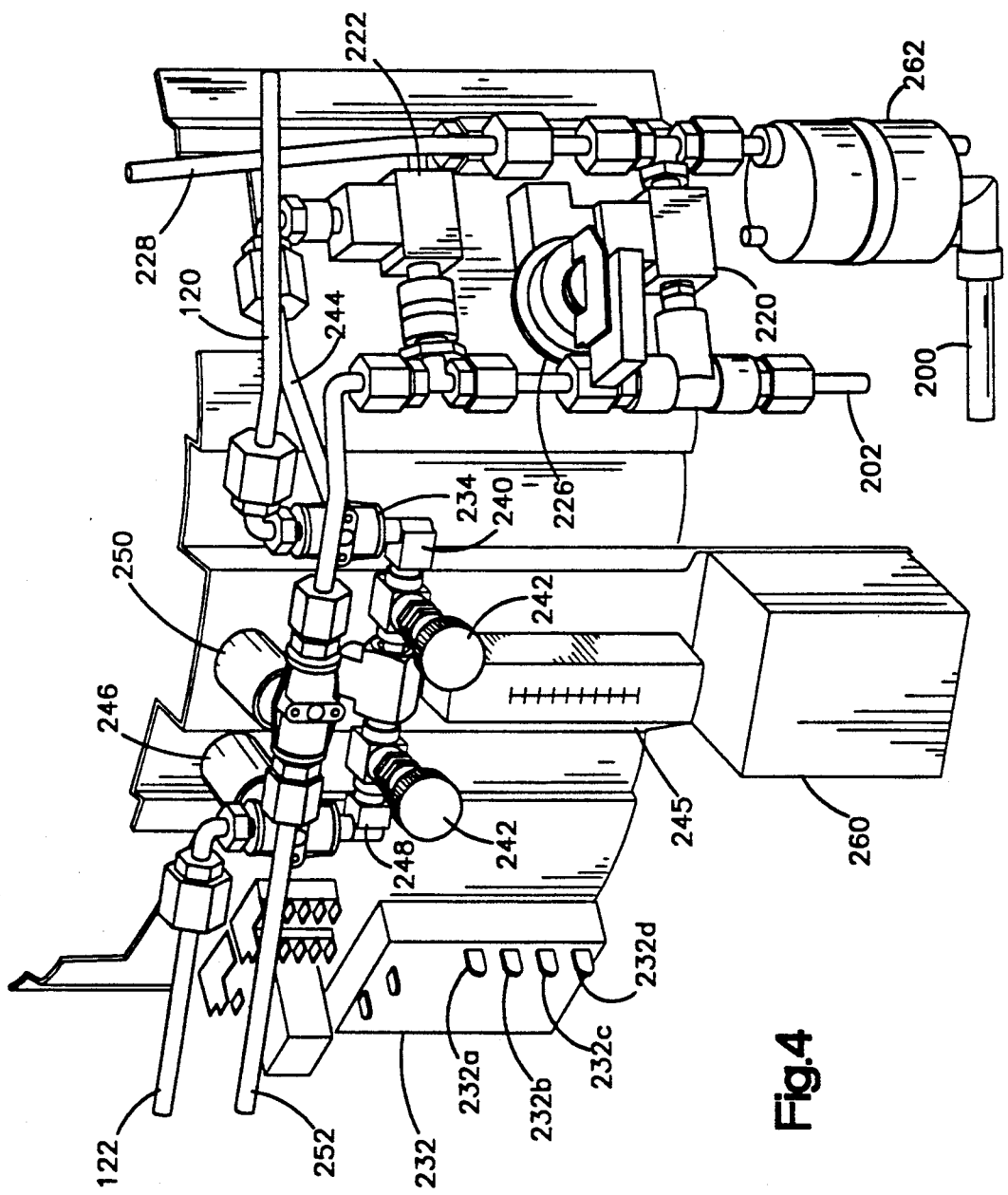
FIG. 4 is an elevational view of a regeneration control apparatus constructed in accordance with the preferred embodiment of the invention.

The valving and other components shrouded by the cover 130a are shown in FIG. 4 and represented schematically in FIG. 2B. The regeneration of a depleted resin tank is initiated by the servo control system and in particular by predetermined movement in the control and usage discs 48, 80 which form part of the servo control system. For purposes of this explanation it will be assumed that the tank assembly 10 is to be regenerated and backwashed. As indicated above, the usage disc 48 determines when a tank assembly is to be regenerated, and in particular, initiates the regeneration cycle by causing the opening of the regeneration control valve 76. This is achieved, as more fully explained in U.S. Pat. Nos. 3,891,552 and 4,298,025 by a coupling arrangement between the usage disc 48 and the control disc 80 which causes the control disc 80 to co-rotate with the usage disc 48 at predetermined intervals, until a port communicating with a fluid chamber 86 is pressurized. Pressurization of this chamber, causes the regeneration control valve 76 to open allowing treated water from the outlet chamber 44 to be conveyed through a nozzle 88 that is aligned with the regeneration control turbine 82 causing its rotation.

Rotation of the turbine 82 is coupled to the control disc 80 by means of the gear train 84. Referring also to FIG. 2A, the control disc 80 in cooperation with a port-defining insert 85, controls the pressurization of fluid chambers associated with the inlet valves 24, 26 and the drain valves 70, 72. In particular, when the tank 10 is to be regenerated, the control disc 80 causes the pressurization of an upper fluid chamber 92a which in turn causes closure of the inlet valve 24. Following closure of the inlet valve 24, a fluid chamber 70a associated with the drain valve 70 is pressurized causing the opening of this drain valve and in effect communicates the inlet passage 30 with an ambient drain 74 as explained above. Again, assuming that the tank assembly 10 is being regenerated, the closing of its associated inlet and outlet valves 24, 60 isolates the tank assembly 10 from both the water source and water outlet 16. The opening of its associated drain valve 70 connects the tank to drain and thereby depressurizes the tank assembly so that it is essentially at ambient pressure.

As seen in FIGS. 1A and 1B, a pair of conduits 200, 202 interconnect the control valve 20 with the brine drum assembly 110. The conduit 200 as seen schematically in FIG. 2A is connected to the outlet chamber 44 and provides a constant source of treated water for the regeneration apparatus. Conduit 202 is connected to a pair of regeneration solution input passages 206, 208 which communicate the conduit 202 with respective outlet passages 42, 52. The passages 206, 208 include associated check valve 180, 182. The check valves allow fluid to flow from the conduit 202 into an associated tank outlet passage when the tank is depressurized but prevent reverse flow.

When a tank is pressurized, the associated check valve is maintained in its closed position and flow from the conduit 202 into the pressurized tank assembly is inhibited. However, when the tank is depressurized upon opening of its associated drain valve, fluid in the conduit 202 will flow into the depressurized tank, through the ion exchange media and filter material, exit the tank through the associated inlet and flow through the associated drain passage and into the drain 75.

In the disclosed apparatus, the regeneration control disc controls the length of time that the tank being regenerated is depressurized, i.e., the length of time its associated drain valve is open. Referring now to FIGS. 2B and 4, whenever a tank is depressurized by the opening of its associated drain valve, fluid flow through the regeneration circuit shown in FIG. 1B is enabled. As seen best in FIG. 2B, during a regeneration cycle, fluid flow from the conduit 202 into the tank assembly being regenerated is enabled (via the drain valve). The flow from the conduit 202 allows fluid to flow into the conduit 200 and renders a pair of venturis 220, 222 operative. As long as the tank is depressurized, fluid from the conduit 202 will flow into the tank being regenerated and allow treated water from the conduit 200 to flow into the regeneration apparatus.

Referring also to FIG. 4, treated water in the conduit 200 will flow concurrently through the venturis 220, 222. The venturi 220 is connected to the brine control valve 112 and hence, draws brine solution from the brine well 102. A pressure switch 226 monitors pressure in a brine draw conduit 228 and closes whenever brine is being drawn through the brine draw conduit. As in normal operation, as soon as the flow of treated water in the conduit 200 is initiated, the pressure switch closes and activates an electronic timer 232 (shown in FIG. 4). The timer is commercially available from SSAC Co. under part no. X2658 (with a time delay of six minutes) and includes four poles 232a–d which are sequentially activated after predetermined time intervals. As soon as the pressure switch 226 closes, the first pole 232a of the timer on and activates a citric acid control solenoid 234 which is disposed in series with the citric acid draw conduit 120. The citric acid draw tube is connected to the chemical draw venturi 222 by a branch conduit or fitting 240 that includes a flow control valve 242 for adjusting the flow rate of citric acid during the draw cycle. The branch conduit joins a venturi feed conduit 244. As long as the solenoid valve 234 is open, the citric acid based regeneration solution in the reservoir 104 will be drawn into the chemical draw venturi 222, mixed with the treated water fed by the conduit 200 and then returned to the control valve 20 via the conduit 202. As seen best in FIG. 2B, the output of the upper and lower venturis 220, 222 are combined so that the fluid delivered to the conduit 202 is a mixture of brine solution and citric acid solution. After a predetermined draw period, the timer deactivates the first pole and activates the second pole 232b.

In the preferred embodiment, this pole is left unconnected i.e. is not connected to any chemical draw solenoid so that only brine solution is drawn through the brine venturi 220 for a predetermined time interval; nothing is drawn through the chemical draw venturi 222. As a result, a barrier is formed (in the tank being regenerated) by the brine solution so that the citric acid and sodium carbonate solutions do not mix within the tank during the regeneration process.

Following a predetermined interval, the third pole 232c of the timer 232 is activated. The third pole is connected to a sodium carbonate control solenoid 246 which controls the communication of the sodium carbonate draw tube 122 with the venturi feed conduit 244. When the solenoid 246 opens sodium carbonate solution from the reservoir 106 is drawn into the chemical venturi 222 by means of a branch conduit or fitting 248 which is connected to the venturi feed conduit 244. The branch conduit 248 also includes a flow control valve 242 for adjusting the flow rate of the sodium carbonate solution during a draw cycle.

A flow meter 245 may be provided for monitoring the flow rate of the citric acid and sodium carbonate solutions, during regeneration. The flow meter 245, as seen in FIG. 2B, is disposed in the venturi feed conduit 244.

According to a feature of the invention, after the sodium carbonate draw cycle is complete, a flushing step is initiated to flush sodium carbonate from the solution feed conduits. This step is performed in order to purge the lines of sodium carbonate solution which has a tendency to precipitate out of solution at normal room temperature. Precipitation of the sodium carbonate could cause clogging of the feed lines or other components.

Referring to FIG. 2B, the flushing step is achieved by opening a flush solenoid 250 concurrently with the sodium carbonate control solenoid 246. The solenoid valves 246, 250 are concurrently activated by the fourth pole 232d of the timer 232. When the flushing solenoid valve 250 is open, fluid from the output of the venturis 220, 222 flows along a flushing conduit 252 (in addition to the conduit 202) and into the upper end of the sodium carbonate draw tube 122, upstream of the solenoid valve 246. A check valve 252 (shown in FIG. 2B) in the draw tube 122 prevents the flushing fluid from entering the sodium carbonate reservoir 106. Instead the flushing fluid flows through the solenoid valve 246, the venturi feed tube 244 and into the chemical venturi 222.

In the preferred embodiment, the timing of the various regeneration cycle steps is selected such that the brine draw through the brine venturi 220 terminates prior to the flushing step. In the illustrated embodiment, the length of time that brine is actually drawn through the brine conduit 228 is determined by the brine control valve 112. In the preferred arrangement, the brine control valve terminates the flow of brine solution from the brine well prior to initiation of the flushing step. In the preferred embodiment, the flushing fluid comprises treated water from the conduit 200 since the brine control valve 112 inhibits the flow of brine solution into the upper venturi 220. It should understood that other control arrangements (such as solenoid control valves and associated components) could be used to control the brine draw timing.

As described above, the regeneration control disc 80 controls the overall regeneration time and the backwashing of the tank being regenerated. When the disc reaches the backwash position, the servo control system opens the outlet valve i.e. outlet valve 60, for the regenerated tank. Treated water from the collection chamber 44 is then permitted to flow into the outlet of the regenerated tank. The water flows though the tank sections (i.e., 10b, 10a) in a counter-flow direction and thus backwashes both the ion exchange resin 17b and the filter media 17a.

Eventually, the disc 80 rotates to a position at which regeneration is to be terminated. When the control disc 80 reaches this position, the associated drain valve, i.e., 70 is closed and the inlet valve, i.e., 24 associated with the tank being regenerated is opened, thus repressurizing the regenerated tank. Repressurization of the tank closes its associated check valve, i.e., 180 and thus terminates flow from the conduit 202 into the control valve 20. Once flow is blocked in the conduit 202, flow into the regeneration apparatus via the conduit 200 is also inhibited.

Assuming that the tank assembly 10 is being regenerated, the backwashing step is as follows. Treated water travels down the riser tube 40 and exits at the base of the tank section 10b. The water then travels upwardly through the ion exchange material 17b and rinses the material of the regeneration solution. The rinse water then enters the upper tank section 10a, dislodging and carrying with it, the foreign matter trapped by the filter material and carrying it out the inlet passage 30 and out to the drain 75 by way of the open drain valve 70. After a predetermined amount of rinse water has traveled (in a counter-flow direction) through the tank assembly 10, as determined by the rotation of the control disc 80, the drain valve 70 is closed by depressurizing the chamber 70a and the inlet valve 24 is open by depressurizing the fluid chamber 92a and pressurizing a chamber 92b thus driving a piston 88c upwardly opening the valve 24. Following the regeneration cycle, both tank assemblies 10, 12 are again placed in service and in a "parallel flow" relationship as shown in FIG 1A.

In the preferred and illustrated embodiment, the electrical components of the regeneration apparatus are all low voltage, i.e., 24 volts AC. In particular, a transformer 260 (shown in FIG. 4) is used to convert 120 volt AC to 24 volt AC for operating the timer 232 and the various solenoid valves 234, 246, 250. In addition, the regeneration circuit includes filters at various locations in order to trap particles carried in the fluids. For example, a filter 262 is located in the conduit 200 to capture particles prior to entering the venturis. Filter 264 are also employed in the draw tubes 120, 122 of both the citric acid and sodium carbonate reservoirs 104, 106, respectively.

According to a further feature of the invention, the sodium carbonate reservoir is maintained at a temperature above ambient in order to inhibit the precipitation of sodium carbonate from solution. As best seen in FIG. 3, a heating assembly 270 is disposed in the reservoir 106 and includes a heating element 272 located near the base of the reservoir. A sheath 270a extends upwardly from the element 272 and carries wires for providing electrical power to the heater. In the preferred embodiment, the heater comprises a self-regulating element that maintains a fixed temperature or temperature range, i.e., 110°-120° F. The heating element may comprise a unit that is commercially available from Hartford Eichenauer Inc. under part no. (12-36 Volt) PTC UL 82-110-40-35-54-1/6/U. In order to further inhibit precipitation of sodium carbonate out of solution an insulating material 276 is disposed around the reservoir 106. The insulation reduces the power requirements for the heater 272 and in addition maintains the solution in a heated state for an extended period of time should power to the unit be terminated.

According to another feature of the invention, the regeneration solution reservoirs are sized differently and include color coded caps of diverse sizes to reduce the possibility of installing an improper solution into the reservoirs and to reduce the possibility of exchanging the reservoir covers.

The disclosed water treatment system is capable of treating "problem water" by a residential customer. The disclosed apparatus can be easily maintained by a typical residential user and does not require handling of hazardous chemicals. In fact, the citric acid and sodium carbonate based solutions are considered food grade chemistry. The disclosed system can effectively treat water having relatively low pH and relatively high iron content.

In the preferred embodiment, the control system is arranged such that when the usage disc 48 rotates again to a position indicating that regeneration is necessary, the alternate tank assembly, in this case tank assembly 12, is regenerated. Again, regeneration is initiated by the co-rotation of the water usage and control discs 48, 80 until a port communicating with the regeneration control valve 76 is pressurized thus opening the valve.

As seen in FIGS. 1A and 2A, when the tank assembly 12 is to be regenerated and backwashed, the control disc 80 first causes the pressurization of a valve closure chamber 94a effecting closing of the inlet valve 26 associated with the tank assembly 12. The control disc then effects pressurization of a drain valve opening chamber 72a effecting opening of the drain valve 72 associated with the tank assembly 12. The regeneration steps are then performed by the system as described above. Regeneration chemistry from the brine drum assembly 110 is fed to the tank assembly 12 via the passage 208 and check valve 182.

During the backwashing step, the outlet valve 62 is opened and rinse water from the collection chamber 44 travels into the outlet passage 52, down the riser tube 50 of tank assembly 12 and then up through the ion exchange material 17b and filter media 17a contained in the tank sections 12b, 12a. The foreign matter in the filter bed 17a is thus conveyed out of the tank 12 and to the ambient drain 75 by way of the open drain valve 72. After a predetermined backwashing time, the drain valve 72 is closed by depressurizing the chamber 72a and the inlet valve 26 is opened by depressurizing the chamber 94a and pressurizing a chamber 94b, thus driving the piston 90 upwardly.

Turning now to FIG. 2A, 2B, 5A and 5B, the control system for controlling the opening and closing of the various valves forming part of the control valve assembly 20 will be further discussed and explained in greater detail.

As described above, the water treatment apparatus includes a pair of tank assemblies 10, 12 which treat and filter water delivered to the apparatus by an inlet conduit 14 and delivers it to an outlet conduit 16. The control valve assembly 20 interconnects the filter tank assemblies 10, 12 and controls the intercommunication between the tank assemblies, and the regeneration of an exhausted or depleted tank assembly. As indicated above, the construction of the control valve assembly 20 is similar to the construction of the water softener control valves disclosed in U.S. Pat. Nos. 3,891,552 and 4,298,025 which have been previously incorporated by reference. Reference should be made to these patents for constructional details not shown or discussed here. The control valve assembly 20, however differs from the control valves disclosed in the previous patents in that with the disclosed control valve, in normal service operation, both tank assemblies 10, 12 are on line concurrently and in a "parallel flow" relationship. The control valve assembly 20 controls the intercommunication between the tank assemblies 10, 12, the communication between these tank assemblies and the inlet conduit 14, and the regeneration of an exhausted tank.

The valve assembly 20 includes a plurality of water pressure operated valves, the opening and closing of which are controlled by fluid signal control system. Whether the tank assemblies 10, 12 are on-line or off-line is determined by the inlet valves 24, 26 disposed in an inlet chamber 14a. The inlet conduit 14 fluidly communicates with the inlet chamber 14a. The inlet valves 24, 26 control the communication between the inlet chamber 14a and respective tank inlet passages 30, 32. Opening the valves 24, 26 allows water being delivered by the inlet conduit 14 to proceed into the tank assemblies 10, 12.

The valves 24, 26 are operatively connected to pistons 88, 90 disposed in associated fluid chambers. The application of fluid pressure above the pistons (to chambers 92a, 94a) applies valve closing forces to urge the valves 24, 26 into engagement with respective valve seats. The application of fluid pressure to the underside of the pistons (to chambers 92a, 92b) exerts valve opening forces.

The outlet valves 60, 62 are similarly configured and include pistons 96, 98 disposed in chambers 100, 101. The application of fluid pressure above and below the pistons 96, 98 applies valve closing and opening forces, respectively for moving the valves 60, 62 towards and away from associated valve seats.

The valves 60, 62 control the communication between the tank outlet passages 42, 52 of the tank assemblies 10, 12, respectively with the outlet chamber 44. The outlet passages 42, 52 are connected to the top of the discharge risers 40, 50 of the tank assemblies 10, 12 respectively. When the valves are open, water from the tank assemblies 10, 12 is allowed to proceed to the water collection or outlet chamber 44.

The monitoring or usage disc 48 forms part of a water pressure operated control system that controls the generation of fluid signals and the sequence of application of the fluid signals to the piston chambers associated with the various valves.

The monitoring disc 48 cooperates with the regeneration control disc 80. The control disc rotates atop an annular insert 85 that defines a plurality of ports each communicating with an associated signal line. Signal lines a-k extend from the port insert 85 to one of a plurality of piston chambers. The control disc 80 sealingly engages the top surface of the insert 85 and includes structural formations that operate to communicate the ports formed in the insert 85 with either water supply pressure (supplied by a passage 123) or ambient pressure (by communicating the ports with a drain or vent passage 125). The ports and regeneration control disc 80 are arranged so that as the regeneration control disc rotates, the valves are sequentially operated in order to cycle an exhausted or depleted tank assembly through a regeneration cycle.

The drain valves 70, 72 are operated by pistons 136, 138 disposed in respective piston chambers 70a, 72a. In the preferred embodiment, the pistons are single acting and are driven to a valve open position by the application of fluid pressure to their top surfaces via signal lines a, b. The valves 70, 72 are arranged so that pressure in the branch lines 30a, 32a bias the valves towards their closed positions illustrated in FIG. 2A.

The regeneration control valve 76 controls the communication of water pressure from the water collection chamber 44 to the regeneration control turbine 82. The valve 76 includes a single acting piston 144 disposed in the chamber 86. Like the drain valves 70, 72, the valve 76 is biased to its closed position by water pressure in the collection chamber 44 communicated through a passage 148. When the regeneration control valve 76 is opened (by the application of a fluid signal to the top surface of the piston by way of the signal line k) water pressure is allowed to proceed along the passage 148 to a passage which includes a nozzle 88 (shown in FIG. 1A) for directing water against the turbine 82. The turbine 82 is mechanically coupled to the regeneration control disc 80 so that rotation of the turbine effects rotation of the control disc.

The application of fluid signals to the various piston chambers, as controlled by the relative movement of the regeneration control disc 80 with respect to the port insert 85, determines the sequence of valve actuation in the control valve assembly 20. The control disc 80 selectively communicates either water pressure from the collection chamber 44, fed to the disc by the pressure line 123, or the ambient drain pressure via the passage 125, to the various signal lines.

The overall operation of the water treatment apparatus is as follows. During normal operation both tank assemblies 10, 12 are on-line in a parallel flow relationship. Under these conditions, the inlet valves 24, 26 and outlet valves 60, 62 are all open and water concurrently travels from the conduit 14, to the tank assemblies 10, 12, via the passages 30, 32, leaves the tank assemblies by way of the passages 42, 52, travels through the collection chamber 44, finally being discharged into the outlet conduit 16 after traveling by the turbine 46. After the usage disc 48 is rotated by the turbine 46 through a predetermined arc, corresponding to a predetermined amount of water discharged by the tank assembly 10, a regeneration cycle is initiated. As fully disclosed in U.S. Pat. Nos. 3,891,552 and 4,298,025, the usage monitoring disc 48 initiates a regeneration cycle by causing an initial rotation in the regeneration control disc 80 which uncovers a port communicating with the signal line k thus causing the application of water pressure to the chamber 86, effecting opening of the regeneration control valve 76. Once the valve 76 opens, a flow of water from the collection chamber 44 against the regeneration control turbine 82 is established, thus causing the continued rotation of the control disc 80.

As mentioned earlier, as the regeneration control disc rotates, ports defined by the insert 85, communicating with the signal lines a-k are communicated with either water pressure or drain pressure to either open or close the various valves. At the commencement of the regeneration cycle for the tank assembly 10, the inlet valve 24 is closed by pressurizing the signal line f thus placing the tank assembly 10 off-line.

Regeneration of the tank assembly 10 then continues by pressurizing the signal line a to open the drain valve 70 so that the inlet passage 30 of the tank assembly 10 is communicated to the drain 75.

When a regeneration cycle is again indicated by appropriate movement in the usage disc 48, the control valve 20 is arranged such that the alternate tank, in this case, the tank assembly 12 is taken off-line, regenerated and then placed back on-line. It should be apparent that with the disclosed invention, full-system capacity as determined by the combined flow rates sustainable by the tank assemblies 10, 12 is always available except for short intervals of time when an exhausted or depleted tank is being regenerated. During regeneration, although the maximum flow rate of treated water is reduced, it is not completely interrupted.

The riser tube 40 of the tank assembly 10 includes a flow restrictor 199 disposed near the upper end of the riser 40 (as viewed in FIG. 1) to compensate for slight flow imbalances between the tank assemblies 10, 12. With the disclosed control valve assembly 20, the flow path between the inlet 14 and the tank assembly 12 is slightly longer than the flow path from the inlet 14 to the tank assembly 10. The restrictor 199, compensates for this difference in flow path length and balances the tank assemblies 10, 12 so that flow out of the tank assemblies 10, 12 is substantially equal when both are on-line, in a parallel flow relationship.

Figure 5B:
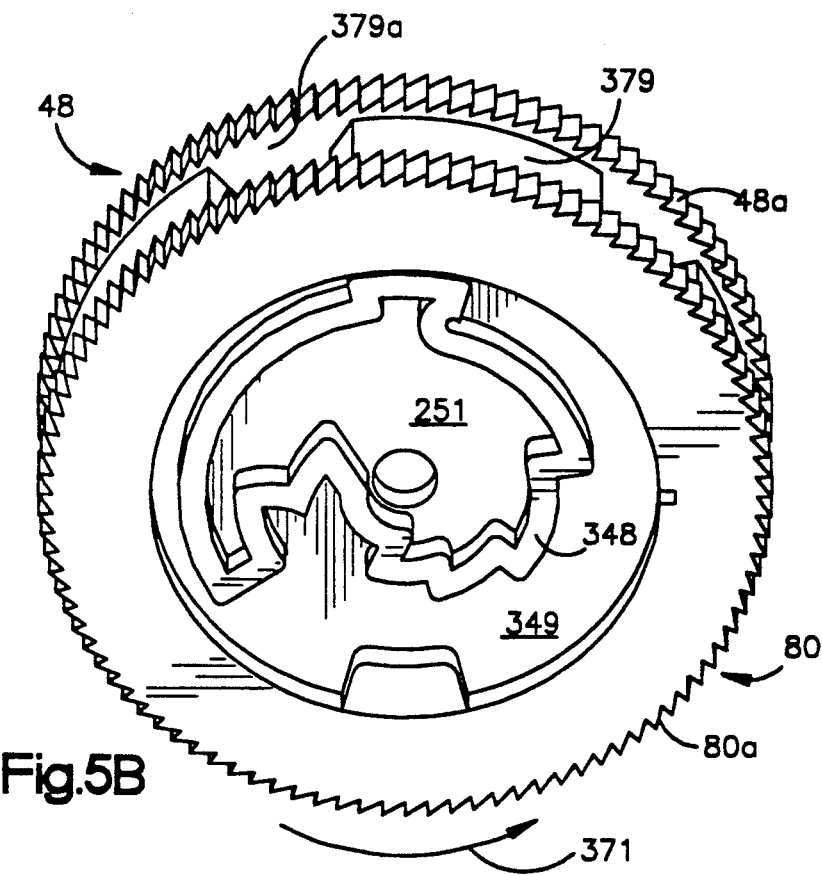
FIGS. 5A and 5B are a perspective view of a regeneration control disc and an associated port insert, forming part of the present invention.
Figure 5A:
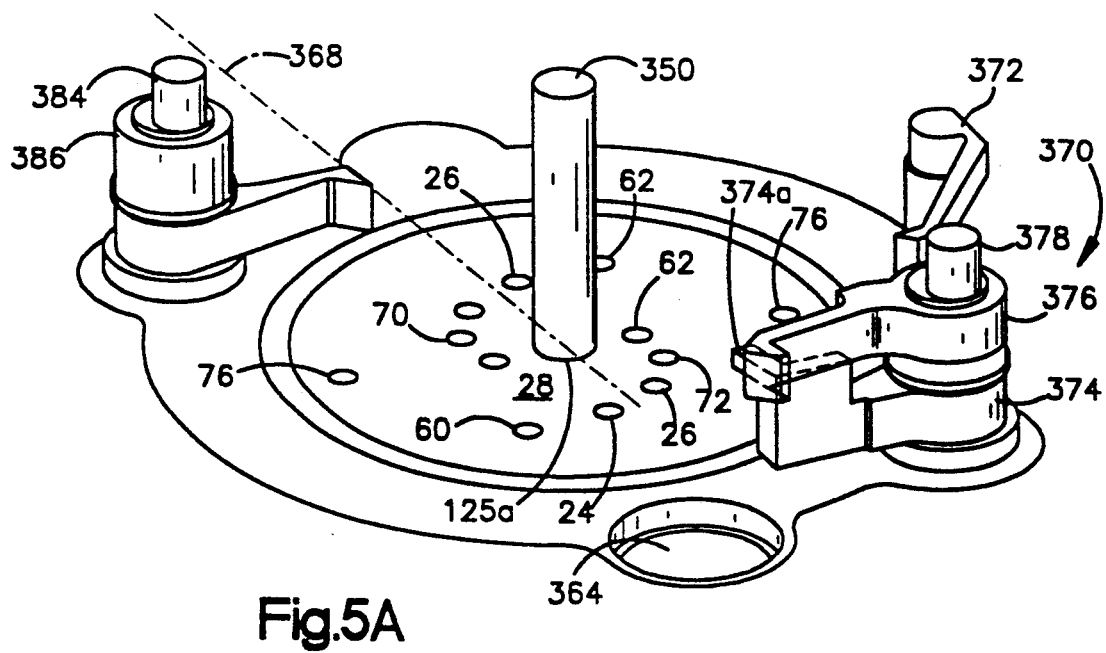

Referring also to FIGS. 5A and 5B, the regeneration control disc 80 sealingly engages and rotates atop the circular port-defining insert 85. The ports defined by the insert communicate with the various piston chambers. The underside of the regeneration control disc 80 includes a depending wall 348 that divides the underside of the disc 80 into pressurized and drain regions 349, 251. The port insert 85 includes a pair of drain apertures 125a located on either side of an upwardly extending stub shaft 350 about which both the regeneration control disc 80 and the water usage disc 48 rotate. The drain apertures 125a communicate with the drain chamber 74 through the passage 125 (shown in FIG. 2A) which is integrally formed in the valve body. Thus, the drain region of the regeneration control disc is maintained at the ambient drain pressure.

As seen best in FIGS. 1A, 2A, the discs 48, 80 rotate in a chamber 358 defined by a recess 360 formed in the top of the housing and a top cover 362 which overlies the recess. As seen in FIGS. 5A and 5B, pressurized water is admitted to the chamber 358 through an aperture 364. The aperture 364 is represented by the feed line 123 in FIG. 2A.

Two sets of ports are provided in the insert 85 and are located symmetrically about an imaginary diametrical line 368. The ports to the left of the line 368 control the regeneration for the tank assembly 10 whereas the ports to the right of the line 368 control the regeneration for the tank assembly 12. During a regeneration cycle, the control disc 80 rotates 180° to effect the regeneration of one of the tank assemblies. The location of the ports and their function, as shown in FIG. 5A correspond to the ports shown and described in U.S. Pat. Nos. 3,891,552 and 4,298,025. As fully explained in these earlier patents, the depending wall 348 controls the communication of pressurized water from the pressurized region 349 to the ports or communicates the ports with the drain region 35; to depressurized the respective chambers. The ports and their function are labeled in FIG. 5A and indicate which valves they are associated with.

The inlet valves 24, 26 and outlet valves 60 and 62 each include "top" and "bottom" ports. The "top ports" communicate with the top of the associated operating pistons 88, 90, 96, 98 and the pressurization of these ports apply a valve closing force. Conversely, the "bottom ports" communicate with the underside of the pistons and apply valve opening forces when pressurized.

Usage disc 48 and the regeneration control disc 80 are preferably rotated by a drive mechanism similar to the one disclosed in U.S. Pat. No. 4,298,025. Referring to FIGS. 5A and 5B, the discs 48, 80 are driven by a ratcheting mechanism that includes a plurality of pawls. As seen best in FIG. 5B, the usage disc 48 rotates atop and concentrically with the regeneration control disc 80. The discs 48, 80 each include peripheral ratchet teeth 48a, 80a respectively. The water usage disc 48 is rotated by a pawl arrangement indicated generally by the reference character 370. Both discs rotate in the direction indicated by the arrow 371; an anti-reverse pawl 372 prevents reverse rotation of the disc 48.

The pawl arrangement 370 includes a pair of individual pawls 374, 376, concentrically journaled on an eccentric shaft 378. The pawls 374, 376 may be spring biased towards engagement with respective gear teeth 80a, 48a as fully explained in the above identified patents. Alternate mechanical arrangements may also be employed to cause the pawls to intermittently engage the teeth 48a of the usage disc 48 upon rotation of the eccentric shaft 378. The shaft 378 is coupled to the water usage turbine 46 through a reduction gear train 49 (shown in FIG. 1). In operation, the usage turbine 46 and hence the water usage disc 48 rotates in proportion of the amount of discharged water discharged by the valve assembly 20.

The usage disc 48 also includes an axially depending flange 379 that is interrupted by a plurality of circumferentially spaced slots 379a. The number and position of the slots 379a determine the frequency of regeneration. The lower pawl 374 of the ratchet mechanism 370 includes a prong 374a that extends into sliding engagement with the flange 379.The prong 374a is sized so that when in engagement with the flange, the pawl 374 is maintained out of engagement with the regeneration control disc 80. When the prong 374a, however, enters one of the slots 379a, the pawl 374 engages the ratchet teeth 380a of the regeneration control disc 80 so that rotation of the eccentric shaft 378 causes concurrent rotation in the discs 48, 80. The initial rotation of the regeneration control disc 80 by the lower pawl 374 causes one of the control valve ports in the port insert 85 to be pressurized, thus initiating regeneration.

When the control valve 76 (shown in FIG. 1) is open, a fluid stream is directed to the regeneration control turbine 82 (shown in FIGS. 1) located in a turbine chamber 143. The turbine 82 is mechanically coupled to a regeneration drive pawl 386 through the reduction gear train 84. The pawl is journaled in an eccentric shaft 384. Rotation of the turbine 82 thus effects incremental rotation of the regeneration control disc 80 and in so doing, effects a regeneration cycle. The regeneration cycle continues until the control port communicating with the control valve chamber 86 (shown in FIG. 2A) is depressurized thus closing the control valve 76.

For a typical residential user, a water softener would be constructed as follows. Each tank assembly would include approximately 0.6 cubic feet of AMBERLITE DP-1 ion exchange resin. It has been found that 12% (by weight) solution of citric acid and a 27% (by weight) solution of sodium carbonate are preferred solution strengths for the regeneration solution reservoirs 104, 106. As is conventional, a saturated brine solution would comprise substantially 26% sodium chloride (by weight), at a typical ambient temperatures.

The timer/sequencer 232 is selected to provide six minute cycle intervals. In this example, citric acid is drawn for six minutes followed by a six minute brine draw which is then followed by a six minute sodium carbonate draw. For an ion exchange bed having approximately 0.6 cubic feet of ion exchange media, it has been found that drawing 400 ml of citric acid, and 600 ml. of sodium carbonate, during the regeneration cycle provides satisfactory results. As indicated above, brine is drawn concurrently and mixed with the citric acid and sodium in carbonate. The total brine drawn throughout the regeneration cycle is selected to provide substantially 3 pounds of sodium chloride in solution. In this disclosed system, it has been found that flushing the sodium carbonate feed lines for approximately 1 to 2 minutes is sufficient.

In the illustrated embodiment, the flushing step commences with activation of the fourth pole 232d of the timer 232 which occurs approximately 18 minutes after the commencement of regeneration and terminates when the control disc 80 rotates to the backwash position. When backwash is initiated, fluid flow from the control valve 20 into the conduit 200 is terminated. As a result, the flushing step is also terminated.

During normal service of the preferred treatment system, the tank assemblies 10, 12 are both on-line in a parallel flow relationship. This arrangement provides several advantages. Firstly, the flow rate sustainable by the system is greater than it would be if only one tank were on line. Secondly, potential bacterial growth in a stagnant tank is substantially reduced. It has been found that maintaining a regenerated tank off line under some conditions may promote the propagation of bacteria.

It should be understood, however, that the principals of the present invention can be utilized in other types of water treatment systems including twin tank water softening systems in which only one tank is maintained on line while the other tank is regenerated and kept off line until the first tank is requires regeneration.

It is believed that the disclosed regeneration process and apparatus, also reduces the potential for bacteria growth. It is believed that the substantial swings in pH that the resin is subjected to, during the regeneration process discourages the growth of bacteria.

Although the invention has been described with a certain degree of particularity, it should be understood that those skilled in the art can make various changes to it without departing from the spirit or scope of the invention as hereinafter claimed.

We claim:

1. A method of regenerating a weak acid cation exchange resin, comprising the steps of:
    a) contacting said resin with a solution of sodium chloride and citric acid for a predetermined time;
    b) then contacting said resin with a barrier solution;
    c) then contacting said resin with a sodium carbonate solution for a first predetermined length of time; and,
    d) then rinsing said resin with water for a second predetermined length of time.

2. The method of claim 11 wherein said step of contacting said resin with a barrier solution comprises the step of contacting said resin with a sodium chloride brine solution for a predetermined length of time intermediate said step of contacting said resin with a solution of citric acid and sodium chloride and said sodium carbonate solution contact step.

3. The method of claim 1 further comprising the step of heating said sodium carbonate solution to inhibit precipitation of said sodium carbonate out of said solution.

4. The method of claim 1 wherein said step of contacting said resin with said sodium carbonate solution includes the conveying of said sodium carbonate solution from a reservoir to said resin along a fluid path and further comprises the step of flushing at least a portion of said sodium carbonate fluid path following said sodium carbonate solution contact step.

5. A method of regenerating a weak acid cation exchange resin, comprising the steps of:
    a) contacting said resin with a predetermined quantity of substantially a 12% (by weight) solution of citric acid;
    b) then contacting said resin with a barrier solution;
    c) then contacting said resin with a predetermined quantity of substantially a 27% (by weight) solution of sodium carbonate and,
    d) then rinsing said resin with water for a predetermined length of time.

6. The method of claim 5 wherein said step of contacting said resin with a barrier solution comprises the step of contacting said resin with a predetermined quantity of substantially a 26% (by weight) solution of sodium chloride for a predetermined length of time.

7. A method of regenerating a weak acid carboxylic cation exchange resin, comprising the steps of:
    a) providing a reservoir of brine solution;
    b) providing a reservoir of citric acid solution;
    c) providing a reservoir of sodium carbonate solution;
    d) drawing citric acid solution from said citric acid reservoir and communicating a quantity of said citric acid solution through said resin;
    e) then conveying a predetermined quantity of said brine solution through said resin;
    f) then conveying a predetermined quantity of said sodium carbonate solution through said resin; and,
    g) then rinsing said resin with a predetermined quantity of water.

8. The method of claim 7 further comprising the step of heating said sodium carbonate reservoir to maintain said solution above a predetermined temperature.

9. The method of claim 7 wherein said step of communicating said citric acid solution to said resin is achieved at least in part by aspirating said citric acid solution using a venturi means.

10. The method of claim 9 wherein said step of conveying said sodium carbonate solution through said resin is achieved at least in part by aspirating said sodium carbonate solution using said venturi means.

11. The method of claim 10 further comprising the step of flushing said venturi means including fluid conduits forming part of said venturi means after said step of conveying sodium carbonate solution through said resin.

12. The method of claim 7 wherein said step of conveying said brine solution through said resin is achieved at least in part by aspirating said solution using a venturi means.

13. A method for regenerating a weak acid ion exchange resin comprising the steps of:
   a) providing a reservoir of brine solution;
   b) providing a reservoir of citric acid solution;
   c) providing a reservoir of sodium carbonate solution;
   d) aspirating a pre-determined quantity of said citric acid solution while aspirating a pre-determined quantity of brine solution;
   e) combining said aspirated brine solution and aspirated citric acid solution and conveying said mixture to said ion exchange resin;
   f) then aspirating a pre-determined quantity of sodium carbonate solution while concurrently aspirating a quantity of brine solution;
   g) combining said aspirated sodium carbonate solution and brine solution and conveying said combined fluid to said ion exchange resin;
   h) then rinsing said resin with water.

14. The method of claim 13 further comprising the step of conveying brine solution to said ion exchange resin after terminating the aspirating step of paragraph d) and before commencing the aspirating step of paragraph f).

15. In a multi-tank water-softening process utilizing tanks, each containing an ion exchange resin bed, a method for regenerating a depleted ion exchange resin bed, comprising the steps of:
   a) contacting said depleted resin bed to be regenerated with a citric acid solution formed by drawing a solution of citric acid from a reservoir into a venturi means using softened water discharged by the ion exchange resin bed of another tank;
   b) then contacting said depleted ion exchange resin bed with brine solution to form a barrier;
   c) then contacting said depleted resin bed with a sodium carbonate solution by conveying sodium carbonate solution along a fluid path, from a sodium carbonate reservoir to said venturi means and using said venturi means to aspirate said sodium carbonate solution with softened water discharged by another ion exchange resin bed;
   d) then rinsing said depleted ion exchange resin bed with softened water from said another ion exchange resin bed.

16. The method of claim 15 further comprising the step of flushing said fluid path with flushing fluid.

17. A method of regenerating a weak acid carboxylic cation exchange resin, comprising the steps of:
   a) providing a reservoir of substantially a 26% (by weight) solution of sodium chloride brine solution;
   b) providing a reservoir of substantially a 12% (by weight) solution of citric acid;
   c) providing a reservoir of substantially a 27% (by weight) solution of sodium carbonate;
   d) heating said sodium carbonate reservoir to maintain said sodium carbonate solution above a predetermined temperature in order to inhibit precipitation of sodium carbonate out of said sodium carbonate solution;
   e) drawing citric acid solution from said citric acid reservoir and conveying a predetermined quantity of said citric acid solution through said resin;
   f) then drawing brine solution from said brine reservoir and conveying a predetermined quantity of said brine solution through said resin;
   g) then drawing sodium carbonate solution from said sodium carbonate reservoir and conveying a predetermined quantity of said sodium carbonate solution through said resin using a conduit means fluidly interconnecting said sodium carbonate reservoir and said resin;
   h) then flushing said conduit means; and,
   i) rinsing said resin with a predetermined quantity of water.

18. A method for regenerating a weak acid ion exchange resin comprising the steps of:
   a) providing a reservoir of brine solution;
   b) providing a reservoir of citric acid solution;
   c) providing a reservoir of sodium carbonate solution;
   d) heating said sodium carbonate reservoir to maintain said solution above a predetermined temperature in order to inhibit precipitation of sodium carbonate out of said solution;
   e) communicating a pre-determined quantity of said citric acid solution to said ion exchange resin by placing said citric acid reservoir in fluid communication with an aspirating means for a predetermined length of time while concurrently placing said brine reservoir in fluid communication with said aspirating means whereby a mixture of citric acid solution and brine solution is aspirated into through said ion exchange resin;
   f) terminating said fluid communication between said citric acid reservoir and said ion exchange resin while maintaining said fluid communication between said brine reservoir and said ion exchange resin whereby a quantity of brine solution is aspirated to and through said ion exchange rein;
   g) then communicating a pre-determined quantity of said sodium carbonate solution to said ion exchange resin by placing said sodium carbonate reservoir in fluid communication with said aspirating means for another predetermined length of time;
   h) then flushing said aspirating means; and,
   i) rinsing said resin with water.

* * * * *